Nov. 30, 1926.
A. WEHMEIER
1,608,538
MOTOR CRANK
Filed August 5, 1925
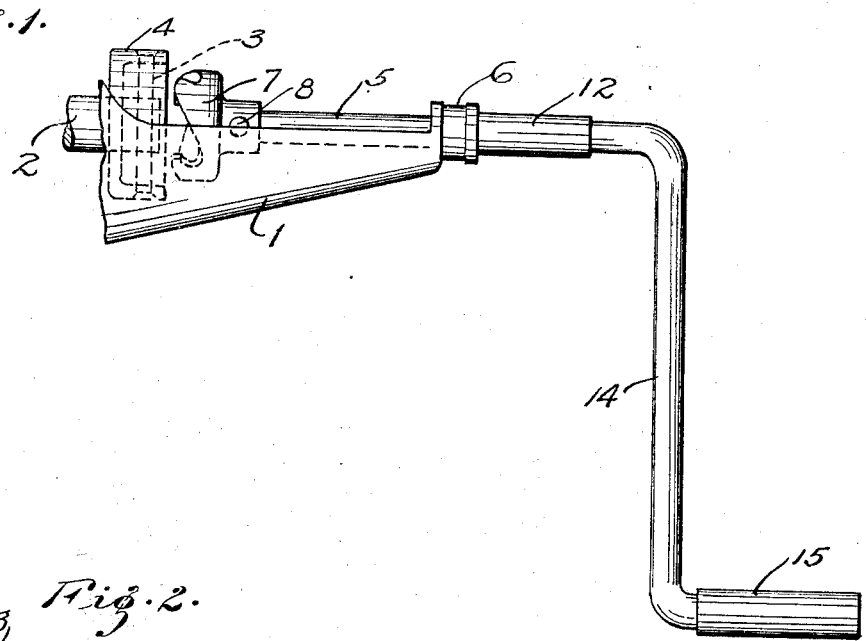
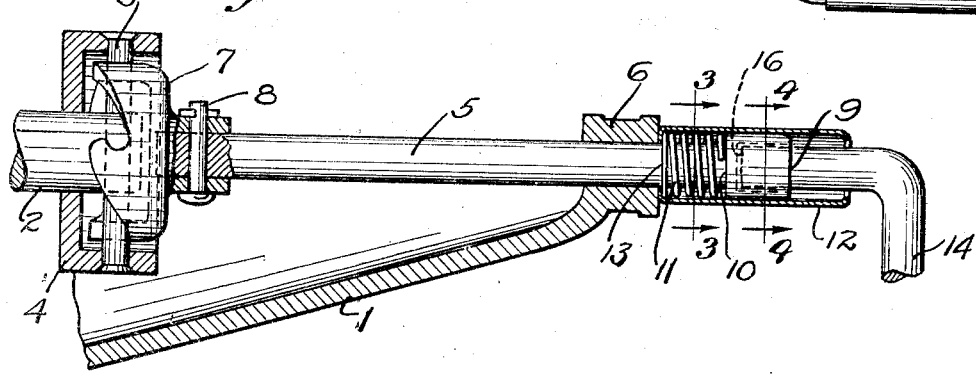
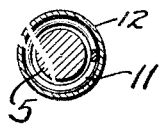
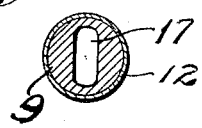
INVENTOR
Albert Wehmeier
BY Cornwall, Bedell & James
ATTORNEYS Patented Nov. 30, 1926.

1,608,538

UNITED STATES PATENT OFFICE.

ALBERT WEHMEIER, OF ST. LOUIS, MISSOURI, ASSIGNOR TO FORE ELECTRICAL MANUFACTURING COMPANY, OF ST. LOUIS, MISSOURI, A CORPORATION OF MISSOURI.

MOTOR CRANK.

Application filed August 5, 1925. Serial No. 48,361.

My invention relates to motor vehicles and consists in an improved starting crank construction adapted to be provided as a part of the original motor construction or equipment and also adapted to be substituted for the original equipmemnt or construction.

The objects of my invention are to provide a neat appearance for the exposed end of the starting shaft; to protect the spring or other moving parts of the device from injury by the weather or external objects; to provide a starting crank shaft adapted for the ready application of a crank thereto and disassembly of the same therefrom; and particularly to provide a detachable crank starting shaft for use on the Ford motor, the standard construction of which comprises a one-piece crank permanently assembled with the motor.

In the accompanying drawings which illustrate a selected embodiment of my invention—

Figure 1 is a side elevation of the end of a Ford motor crank case and crank shaft with my improved starting crank device applied thereto, showing the same disengaged from the motor crank shaft.

Figure 2 is a vertical longitudinal section through the same parts, drawn on a larger scale and showing the crank device engaged with the motor crank shaft.

Figures 3 and 4 are detail transverse sections on lines 3—3 and 4—4 respectively, of Figure 2.

The end of the motor crank case is indicated at 1 and the end of the motor crank shaft extending into the crank case portion 1 is indicated at 2, the same being provided with the standard starting pin 3 and cover 4.

My device includes a straight cranking shaft 5 journaled at 6 in the end of the crank case 1 and provided on its inner end with a standard Ford starting crank ratchet 7 which may be assembled with shaft 5 by a cotter pin 8 in the usual manner.

The outer end of shaft 5 is preferably enlarged as indicated at 9, the enlarged portion providing an inwardly facing shoulder 10 forming an outer seat for a spring 11 coiled around the body of the shaft. A sleeve 12 has its outer end turned inwardly, to engage the outer end of shaft 5, and has its inner end turned inwardly to form a seat for the inner end of spring 11. Preferably I insert a washer 13 between the inner end of sleeve 12 and the end of spring 11.

My device also includes a removable crank 14 one end of which terminates in a roller handle 15 and the other end of which terminates in a flattened portion 16. The enlarged portion 9 of shaft 5 is recessed, as indicated at 17 in Figure 4, to receive the flattened end 16 of the crank handle and non-rotatably engage the same.

Sleeve 12 is preferably given a polished nickel or enamel finish and at all times presents a neat terminus for the starting crank shaft and also forms a housing for the end of the crank shaft and for the spring 11, thereby prolonging the useful life of the latter. When the starting crank is to be used, it may be inserted in the starting shaft and the two may be moved inwardly to engage the crank shaft pin 3 in the same manner as a one-piece starting crank but at all other times the crank handle may be removed and placed in the car.

The use of this accessory on a Ford car eliminates the dangling crank handle which, for practical purposes, is permanently assembled with the motor, and usually hangs downwardly, reducing the road clearance of the car and collecting dirt which renders it unsightly and unpleasant to use. Where the license plate is mounted on the front axle, as frequently is the case, the crank partially obscures the same and this is frequently prohibited by law, making it necessary to tie the handle in an elevated position. The use of my invention eliminates these disadvantages.

While I show my invention particularly adapted for use on a Ford motor and adapted to be easily substituted for the standard Ford crank, I contemplate the use of my invention in connection with other motors as well.

Obviously, the spring 11 could engage a pin or have an inturned end entering a hole in the crank shaft and the crank handle could fit over the end of the crank shaft instead of fitting into the end of the crank shaft. These and other modifications in the details of my invention may be made without departing from the spirit thereof as expressed in the following claims.

I claim:

1. In a motor cranking device, a starting-crank shaft adapted at one end to engage a motor, an irremovable sleeve surrounding said shaft at its opposite end, and a spring concealed within said sleeve, engaging said shaft and the inner end of said sleeve and compressed axially of said shaft.

2. In a motor cranking device, a starting-crank motor-engaging shaft having an inwardly facing shoulder near its outer end, a coiled spring surrounding the reduced portion of said shaft and seated against said shoulder, an irremovable sleeve surrounding and enclosing said spring and the adjacent end of said shaft and having one end engaging the outer end of said shaft and the other end confining the inner end of said spring.

3. In a motor cranking device, a starting-crank motor-engaging shaft having an inwardly facing shoulder near its outer end, a coiled spring surrounding the reduced portion of said shaft and seated against said shoulder, a sleeve surrounding said spring and the adjacent end of said shaft and having inturned ends for engaging the outer end of said shaft and the inner end of said spring respectively, the inner end of said sleeve thereby forming a yielding projection on said shaft for engaging a fixed bearing for said shaft.

4. In a removable crank device for automobile motors, a shaft for the motor starting crank ratchet having an enlarged outer end, a cylindrical sleeve surrounding the outer portion of said shaft with one end inturned over the enlarged end of the shaft and with its other end inturned and spaced a substantial distance from said enlarged shaft end and adapted to bear against the face of the starting crank bearing, and a spring confined between the latter end of said sleeve and the enlarged outer end of said shaft.

5. A removable crank device for automobile motors comprising a straight ratchet shaft, for engagement with the motor crank shaft and having an outer end adapted to non-rotatably engage a removable crank, an irremovable sleeve surrounding and concealing the outer end of said shaft with its inner end adapted to engage the face of the ratchet shaft-bearing, and a spring enclosed by said sleeve and yieldingly thrusting said shaft outwardly said sleeve having an opening in its outer end for permitting a crank arm to be engaged with said ratchet shaft.

In testimony whereof I hereunto affix my signature this 3rd day of August, 1925.

ALBERT WEHMEIER.